US008332268B2

(12) United States Patent
Carruthers et al.

(10) Patent No.: US 8,332,268 B2
(45) Date of Patent: *Dec. 11, 2012

(54) METHOD AND SYSTEM FOR SCHEDULING ONLINE CONTENT DELIVERY

(75) Inventors: Tim Carruthers, Lexington, MA (US);
Robert Hyland, Stoneham, MA (US);
Richard Larson, Lexington, MA (US);
Robert McCready, Hull, MA (US);
John Moran, Somerville, MA (US);
Nathaniel Thurston, Somerville, MA (US)

(73) Assignee: OpenTV, Inc., San Francisco, CA (US)

( * ) Notice: Subject to any disclaimer, the term of this patent is extended or adjusted under 35 U.S.C. 154(b) by 1477 days.

This patent is subject to a terminal disclaimer.

(21) Appl. No.: 11/619,706

(22) Filed: Jan. 4, 2007

(65) Prior Publication Data

US 2007/0107027 A1 May 10, 2007

Related U.S. Application Data

(63) Continuation of application No. 09/767,793, filed on Jan. 23, 2001, now Pat. No. 7,174,305.

(51) Int. Cl.
*G06Q 30/00* (2012.01)
*G06F 15/16* (2006.01)

(52) U.S. Cl. ............... 705/14.52; 705/14.53; 705/14.56; 705/14.61; 705/14.66; 705/14.73; 709/216; 709/218; 709/224

(58) Field of Classification Search ............... 705/14.52, 705/14.53, 14.56, 14.61, 14.66, 14.73; 709/216, 709/218, 224

See application file for complete search history.

(56) References Cited

U.S. PATENT DOCUMENTS

| 5,347,632 A | 9/1994 | Filepp et al. |
| 5,572,643 A | 11/1996 | Judson |
| 5,623,404 A | 4/1997 | Collins et al. |
| 5,664,948 A | 9/1997 | Dimitriadis et al. |
| 5,740,549 A | 4/1998 | Reilly et al. |
| 5,742,521 A | 4/1998 | Ellenby et al. |
| 5,754,774 A | 5/1998 | Bittinger et al. |
| 5,761,662 A | 6/1998 | Dasan |
| 5,794,210 A | 8/1998 | Goldhaber et al. |
| 5,801,747 A | 9/1998 | Bedard |
| 5,812,784 A | 9/1998 | Watson et al. |
| 5,848,397 A | 12/1998 | Marsh et al. |

(Continued)

FOREIGN PATENT DOCUMENTS

GB 2280977 2/1995

(Continued)

OTHER PUBLICATIONS

"AdForce and Activate Deliver Next Generation Web Advertising", *Business Wire*, (Nov. 8, 2000).

(Continued)

*Primary Examiner* — Donald L. Champagne
(74) *Attorney, Agent, or Firm* — Schwegman Lundberg & Woessner, P.A.

(57) ABSTRACT

A method and system to schedule delivery of items of content selectively to online users are described. Expected values relating to each user being online is determined during a given time period. An ordered list of the items of content to be selectively delivered to the users is generated based on the expected values. The ordered list may be prioritized to meet delivery requirements associated with the items of content.

56 Claims, 3 Drawing Sheets

U.S. PATENT DOCUMENTS

| | | | |
|---|---|---|---|
| 5,913,040 | A | 6/1999 | Rakavy et al. |
| 5,926,800 | A | 7/1999 | Baronowski et al. |
| 5,946,646 | A | 8/1999 | Schena et al. |
| 5,948,061 | A | 9/1999 | Merriman et al. |
| 5,959,623 | A | 9/1999 | van Hoff et al. |
| 5,973,683 | A | 10/1999 | Cragun et al. |
| 5,974,398 | A | 10/1999 | Hanson et al. |
| 6,005,597 | A | 12/1999 | Barrett et al. |
| 6,012,051 | A | 1/2000 | Sammon, Jr. et al. |
| 6,014,638 | A | 1/2000 | Burge et al. |
| 6,026,368 | A | 2/2000 | Brown et al. |
| 6,049,777 | A | 4/2000 | Sheena et al. |
| 6,067,565 | A * | 5/2000 | Horvitz .................. 709/218 |
| 6,088,722 | A | 7/2000 | Herz et al. |
| 6,119,098 | A | 9/2000 | Guyot et al. |
| 6,134,532 | A | 10/2000 | Lazarus et al. |
| 6,144,944 | A | 11/2000 | Kurtzman, II et al. |
| 6,157,946 | A | 12/2000 | Itakura et al. |
| 6,163,316 | A | 12/2000 | Killian |
| 6,177,931 | B1 | 1/2001 | Alexander et al. |
| 6,201,536 | B1 | 3/2001 | Hendricks et al. |
| 6,236,978 | B1 | 5/2001 | Tuzhilin |
| 6,286,012 | B1 | 9/2001 | Kindo et al. |
| 6,317,883 | B2 | 11/2001 | Marics |
| 6,351,596 | B1 | 2/2002 | Ostrover |
| 6,366,298 | B1 | 4/2002 | Haitsuka et al. |
| 6,438,752 | B1 | 8/2002 | McClard |
| 6,460,036 | B1 | 10/2002 | Herz |
| 6,463,585 | B1 | 10/2002 | Hendricks et al. |
| 6,477,509 | B1 | 11/2002 | Hammons et al. |
| 6,487,538 | B1 | 11/2002 | Gupta |
| 6,567,854 | B1 | 5/2003 | Olshansky et al. |
| 6,571,279 | B1 | 5/2003 | Herz et al. |
| 6,742,033 | B1 * | 5/2004 | Smith et al. .................. 709/224 |
| 2001/0049620 | A1 | 12/2001 | Blasko |
| 2002/0004744 | A1 | 1/2002 | Muyres et al. |
| 2002/0013729 | A1 | 1/2002 | Kida |
| 2002/0162115 | A1 | 10/2002 | Bruckner et al. |

FOREIGN PATENT DOCUMENTS

WO      WO-0049801 A1      8/2000

OTHER PUBLICATIONS

"AdForce Gains Momentum in the High-Tech Industry; Sun Microsystems Plans to use AdForce for Centralized Ad Serving", *Business Wire*, (Sep. 23, 1999).

"Merriam-Webster's Collegiate Dictionary", *Britannica Online, Definition of "Online"*, http://www.search.eb.com/dictionary,(May 25, 2005).

* cited by examiner

METHOD AND SYSTEM FOR SCHEDULING ONLINE CONTENT DELIVERY

RELATED APPLICATION

The present application is a continuation of, and claims priority from, U.S. patent application Ser. No. 09/767,793 filed Jan. 23, 2001 now U.S. Pat. No. 7,174,305, which is incorporated herein by reference.

FIELD OF THE INVENTION

The present invention relates generally to managing the delivery of content to online users and, more particularly, to a method and system for scheduling content delivery.

BACKGROUND

Online advertising (typically banner advertisements) directed to Web users or subscribers has grown rapidly along with the growth of the Internet and e-commerce activity. Web advertising is frequently targeted to particular Web users. For example, it is known to profile Web users by determining their demographics and interests, and to selectively transmit advertisements to only those users having particular desired profiles. Information on users may be obtained from the users themselves through questionnaires or from other profiling techniques.

Online content delivery services typically contract with advertisers to deliver some specified number of advertisements (i.e., impressions) to Web users having particular profiles. In scheduling the delivery of advertisements, a number of variable factors are involved such as, e.g., when a given user will log on or for how long. Accordingly, the content delivery services typically pre-schedule all content deliveries for all users using very conservative estimates of scheduled deliveries in order to fulfill advertising contracts. Known content delivery systems are thereby very inefficient in utilizing inventory (available user screen real estate) and fulfilling advertiser contracts.

SUMMARY

A method and system for scheduling content delivery to online users is described. Operations research and yield management techniques are utilized to forecast the availability of user screen real estate (i.e., inventory), optimize the use of surplus inventory, and generate on-demand selective content delivery schedules to transmit content to the users.

Briefly, the scheduler system reviews new advertising campaigns proposed by advertisers and predicts whether campaign objectives are achievable in view of forecasted inventory. The system generates a master delivery plan based on expected values to fulfill advertiser contracts and optimize usage of surplus inventory. The plan is periodically modified based on delivery feedback information. The system also dynamically generates individual user schedules on user login.

These and other features and advantages of the present disclosure will become readily apparent from the following detailed description wherein embodiments are shown and described by way of illustration of the best mode. As will be realized, several details may be capable of modifications in various respects. Accordingly, the drawings and description are to be regarded as illustrative in nature and not in a restrictive or limiting sense.

BRIEF DESCRIPTION OF THE DRAWINGS

Reference should be made to the following detailed description taken in connection with the accompanying drawings wherein.

DETAILED DESCRIPTION

U.S. patent application Ser. No. 09/558,755 filed Apr. 21, 2000 and entitled "Method And System For Web User Profiling And Selective Content Delivery" is expressly incorporated by reference herein. That application discloses a method and system for profiling online users (who are also referred to herein as clients or subscribers) based on their observed surfing habits and for selectively delivering content, e.g., advertising, to the users based on their individual profiles.

Embodiments may be directed to optimizing content delivery to online users and may be implemented in a content delivery system such as, e.g., that disclosed in the above-mentioned application Ser. No. 09/558,755. Very briefly, in accordance with embodiments, operations research and yield management techniques are utilized to forecast the availability of user screen real estate (i.e., inventory), optimize the use of surplus real estate, and generate on-demand selective content delivery schedules to transmit content to the users. The content is displayed on user computer display devices, and may comprise advertising, e.g., in the form of banner advertisements or pop-up advertisements.

Figure 1:
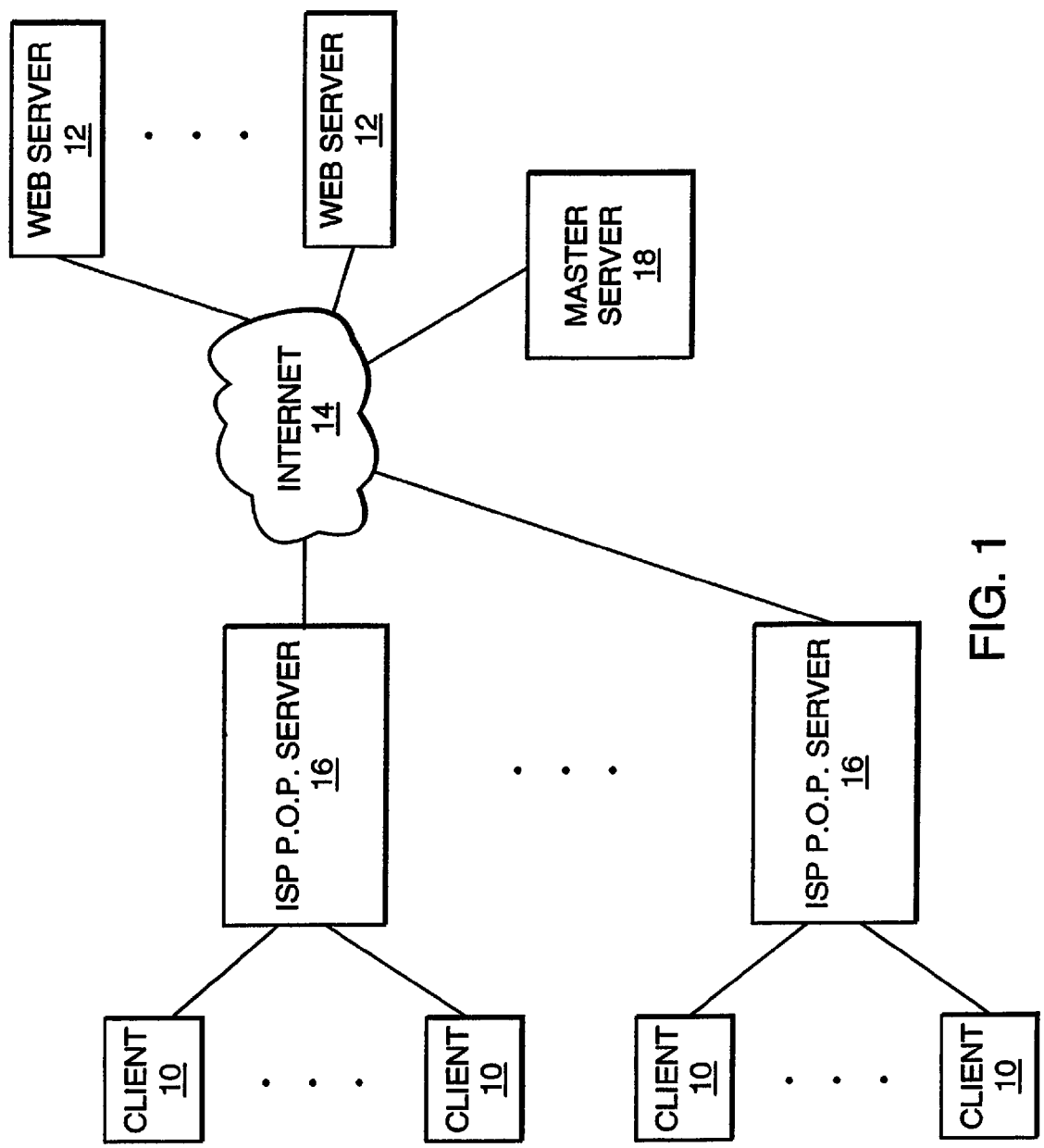
FIG. 1 is a schematic diagram illustrating of a representative network in which the system is implemented in accordance with an embodiment.

FIG. 1 illustrates a general representative network in which the inventive scheduler system may be implemented. The network includes a plurality of client machines 10 operated by various individual users. The client machines 10 connect to multiple servers 12 via a communication channel 14, which may be the Internet. It may, however, alternatively comprise an Intranet or other known connections. In the case of the Internet, the servers 12 are Web servers that are selectively accessible by various clients. The Web servers 12 operate so-called "Web sites" and support files in the form of documents and pages. A network path to a Web site generated by the server is identified by a Uniform Resource Locator (URL).

One example of a client machine 10 is a personal computer such as a Pentium-based desktop or notebook computer running a Windows operating system. A representative computer includes a computer processing unit, memory, a keyboard, a mouse and a display unit. The screen of the display unit is used to present a graphical user interface (GUI) for the user. The GUI is supported by the operating system and allows the user to use a point and click method of input, e.g., by moving the mouse pointer on the display screen to an icon representing a data object at a particular location on the screen and pressing on the mouse buttons to perform a user command or selection. Also, one or more "windows" may be opened up on the screen independently or concurrently as desired. The content delivered by the system to users is displayed on the screen.

Other types of client devices are also possible such as mobile Internet devices (e.g., Web-connected cellular phones and personal digital assistants).

Client machines 10 typically include browsers, which are known software tools used to access the servers 12 of the network. Representative browsers for personal computers include, among others, Netscape Navigator and Microsoft Internet Explorer. Client machines 10 usually access servers 12 through some private Internet service provider (ISP) such as, e.g., America Online. Illustrated in FIG. 1 are multiple ISP "point-of-presence" (POP) systems, each of which includes an ISP POP server 16 linked to a group of client machines 10 for providing access to the Internet. Each POP server 16 is connected to a section of the ISP POP local area network (LAN) that contains the user-to-Internet traffic. The ISP POP server 16 may capture URL page requests from individual client machines 10 for use in user profiling (if user profiling is based on Web Surfing habits of users) and also to distribute targeted content to users. Also, as will be discussed in detail below, the inventive system also may include a remote master server 18 linked to each ISP POP server 16 through the Internet. The system software may be distributed over the network at the ISP POP servers 16 and the master server 18 as will be discussed below.

As is well known, the World Wide Web is the Internet's multimedia information retrieval system. In particular, it is a collection of servers of the Internet that use the Hypertext Transfer Protocol (HTTP), which provides users access to files (which may be in different formats such as text, graphics, images, sound, video, etc.) using, e.g., a standard page description language known as Hypertext Markup Language (HTML). HTML provides basic document formatting and allows developers to specify links to other servers and files. These links include "hyperlinks," which are text phrases or graphic objects that conceal the address of a site on the Web.

A user of a client machine having an HTML-compatible browser (e.g., Netscape Navigator) may retrieve a Web page (namely, an HTML formatted document) of a Web site by specifying a link via the URL (e.g., www.yahoo.com/photography). Upon such specification, the client machine makes a transmission control protocol/Internet protocol (TCP /IP) request to the server identified in the link and receives the Web page in return.

Figure 2:
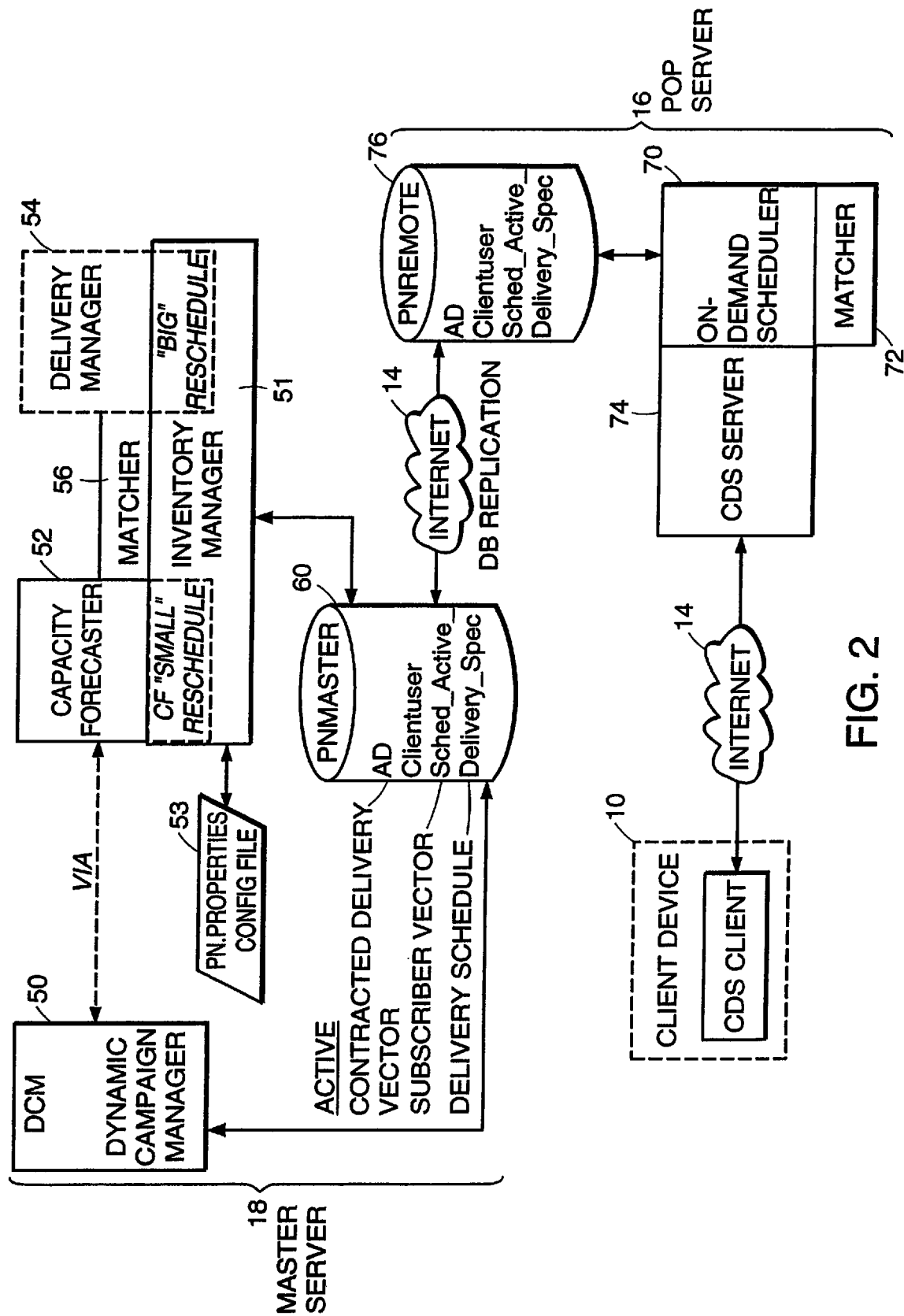
FIG. 2 is a schematic diagram illustrating in greater detail the architecture of the system in accordance with an embodiment.

FIG. 2 illustrates in greater detail the scheduler system architecture. (For simplicity, only a single POP server 16 and a single client 10 are shown.) As illustrated, the master server system 18 includes various software components for managing content delivery including a Dynamic Campaign Manager 50, a Capacity Forecaster 52, a Delivery Manager 54, an Inventory Manager 51, system configuration information 53, and a matcher 56. The master server system 18 also includes a master database 60 storing advertisements and user profiles. Also, On-Demand Scheduler 70, local matcher 72 and content delivery system (cds) server 74 components reside at the ISP POP server 16. The ISP POP server 16 also includes a remote local database 76 storing individual user profile data and advertisements. The Dynamic Campaign Manager component 50 provides a portal to the system for advertisers (or Ad buyers or media buyers who act on behalf of advertisers) to initiate and manage their advertising campaigns. (The terms Ad buyer, media buyer, and advertiser are used interchangeably for purposes of this application.) The advertiser may, e.g., monitor the number of times content has been delivered to a client 10 (i.e., the number of impressions) and the number of click-throughs on that content during the course of a campaign.

The Capacity Forecaster 52 reviews new campaigns proposed by advertisers and predicts whether their campaign objectives are achievable in view of forecasted inventory of user screen real estate. The Capacity Forecaster 52 thereby assists in forming contracts having an expected high degree of success. A 'contract' as used herein is generally an agreement for content delivery typically between the scheduler system operator or owner and an advertiser or media buyer. This agreement specifies various terms including, e.g., the content to be delivered, delivery quantity (i.e., number of impressions), target subscriber group, and start and end dates.

The Inventory Manager 51 generates a candidate plan to fulfill new and existing advertiser contracts and to optimize usage of surplus user screen real estate. The Inventory Manager 51 modifies the plan as needed based on delivery feedback information received from the On-Demand Scheduler 70. The Delivery Manager 54 may generate the best plan for the current days scheduled deliveries. The Delivery Manger 54 is also responsible for balancing deliveries within a day and processing the results of the On-Demand Scheduler. The On-Demand Scheduler 70 dynamically constructs delivery schedules for individual users on user login. The Capacity Forecaster 52, Delivery Manager 54 and On-Demand Scheduler 70 components of the system will be described in greater detail below.

Figure 3:
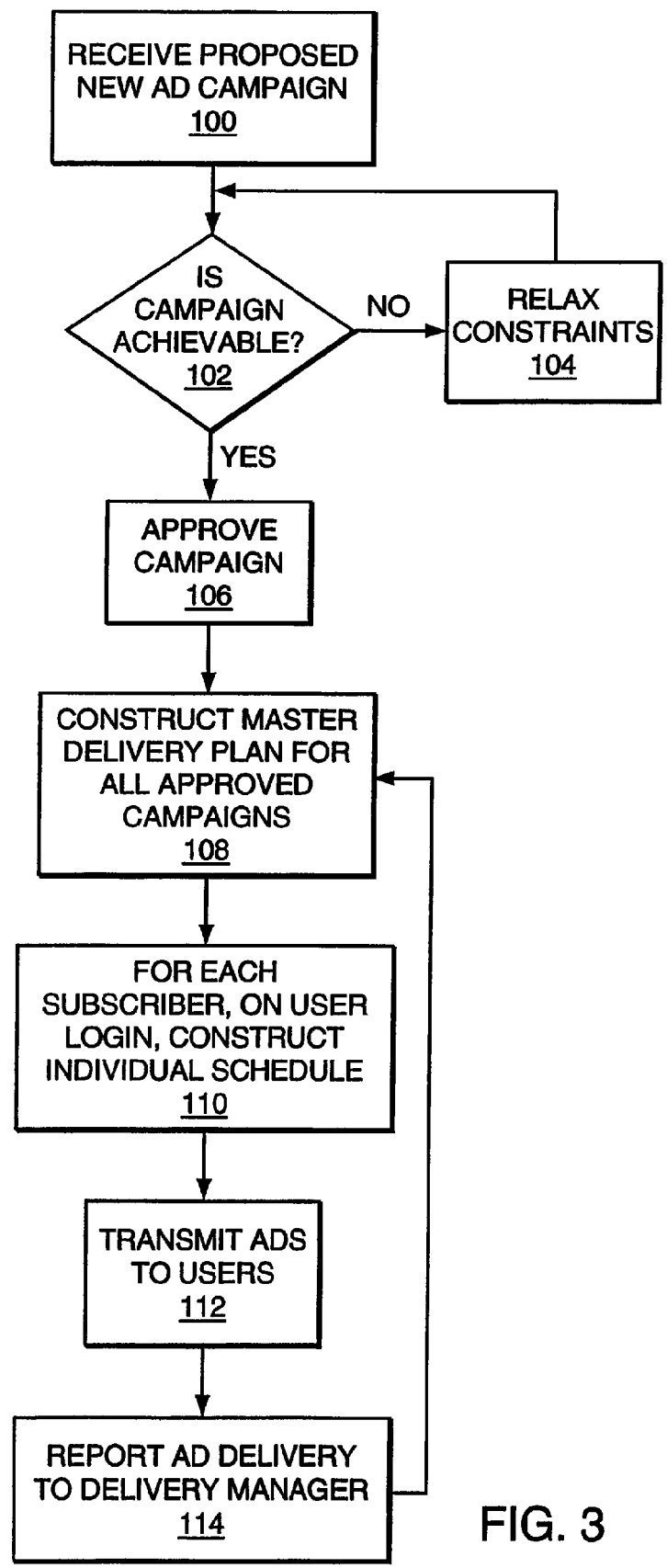
FIG. 3 is a flowchart illustrating in general the process for scheduling content delivery in accordance with an embodiment.

FIG. 3 is a flowchart generally illustrating the process of scheduling and delivering content in accordance with embodiments. At Step 100, the Dynamic Campaign Manager 50 receives a proposed new advertising campaign from an advertiser. At Step 102, the Capacity Forecaster reviews the proposed campaign to determine whether the campaign goals are achievable. If the inventory projections are less then the campaign goals, then at Step 104, the scheduler system identifies and suggests which constraints could be relaxed in order to achieve campaign goals as will be described below. If the campaign is determined to be achievable, it is approved at Step 106.

The Inventory Manager 51 then constructs a delivery plan for all approved campaigns at Step 108. At Step 110, for each subscriber on user login, the On-Demand scheduler 70 constructs an individual delivery schedule. At Step 112 advertisements are transmitted to users based on their individual delivery schedules. The system reports advertisement delivery feedback to the Delivery Manager at Step 114, which is used to update the master delivery plan as will be discussed below.

Capacity Forecaster

The Capacity Forecaster component 52 assists in predicting the success of a campaign proposed by an advertiser. For example, it predicts whether the system will be able to deliver a proposed number of impressions to users of some given profile within a desired period of time. When a new contract with an advertiser is under consideration (i.e., the advertiser proposes a new campaign), the Capacity Forecaster 52 calculates the probable or expected supply (i.e., surplus) of screen real estate on user client devices and approves the contract if an adequate supply is expected for the proposed campaign. If the supply is not sufficiently large, the Capacity Forecaster 52 assists the advertiser in modifying the campaign requirements or constraints set by the Ad buyer by determining which constraints could be modified and how in order to successfully schedule a potential contract.

The Capacity Forecaster 52 determines campaign achievability by examining the number of qualified subscribers who match the campaign's profile using the Matcher and then calculating the current load (or alternatively, the available capacity, i.e., surplus) on those users due to previously scheduled campaigns. More particularly, the Capacity Forecaster 52 calculates the current load (or surplus) based upon statistics of how many impressions a subscriber may support compared to how many advertisements the subscriber is already scheduled to receive due to existing campaigns. (The statistics include data previously gathered on subscribers such as, e.g., how frequently a given subscriber logs on and the lengths of his or her sessions.) The total load on each subscriber is calculated by summing the loads contributed by each campaign. If a sufficient number of available subscribers is not available or if the load on the subscribers is too high, the Capacity Forecaster 52 identifies and suggests constraints to relax so that the campaign goals may be met such as, e.g., increasing the campaign length, reducing the number of requested impressions, or relaxing the profile constraints.

Additionally, the Capacity Forecaster 52 may periodically re-evaluate campaigns currently under execution, and determine their probability of success, e.g., whether the system will be able to schedule the contracted number of content deliveries based on delivery data feedback that has been received. Again, the Forecaster 52 may determine whether constraints set by the advertiser should be relaxed in order to increase the likelihood of success of the campaign.

Inventory Manager

The Inventory Manager 51 generates a master delivery plan expected to fulfill delivery contracts with advertisers. It uses delivery feedback information received from the On-Demand Scheduler 70 of each POP server 16 in the system to adaptively modify the master plan on a periodic basis.

For each accepted advertising campaign, the Inventory Manager 51 calculates a daily goal number of impressions to meet contract requirements. Advertisers typically desire to distribute the total number of desired impressions equally over each day of the campaign. (Alternatively, other distribution patterns may be used as desired.) The goals are periodically updated, e.g., each day, by comparing the number actually delivered to the desired total number of impressions.

The Inventory Manager constructs the master delivery plan on a periodic basis, e.g., once a day, based on the calculated goals of each of the active advertising campaigns. The plan specifies a prioritized master list of advertisements, which is sent to the On-Demand Scheduler 70 at each POP server 16. The prioritized content list identifies the order in which advertisements are to be displayed. The order is based both upon priority and some weighting mechanism that indicates how many impressions are needed by each campaign.

The Delivery Manager 54 may reorder or reprioritize the master list of scheduled advertisements based upon delivery feedback data and queuing logic/algorithms. For example, if the goal for a given campaign is to evenly distribute an advertisement over the course of the campaign length, the advertisement may be moved down in the queue of advertisements to be displayed if it gets ahead of its daily goals. Similarly, if an advertisement gets behind in meeting its goals, it may be automatically promoted in priority. If an advertisement exceeds its daily goal it may be effectively shut off by being placed at the very end of the queue.

On-Demand Scheduler

The On-Demand Scheduler 70, which resides at each ISP POP server 16 in the system, dynamically constructs an individual ordered list of advertisements to be delivered for each given user upon user login. Each individual list includes advertisements matched to the user and prioritized according to the master list received from the Delivery Manager 54.

When a user or subscriber logs on, the On-Demand Scheduler 70 calls the Local Matcher 72 to identify the advertisements the subscriber is eligible for. This is done by matching the profile of the user (through an anonymous user ID) to the profiles of advertisements in the prioritized master list generated by the Delivery Manager 54. The result is a list of advertisements for which the subscriber is eligible to receive. The On-Demand Scheduler 70 then retrieves any state variables for the advertisements. The variables may indicate, e.g., if a subscriber has previously been sent an advertisement, when (date and time) that subscriber was last sent the advertisement, and how many total times the subscriber has been sent the advertisement.

After the On-Demand Scheduler 70 has the list of eligible advertisements and the state variables for those advertisements, it preferably examines any constraints for each advertisement. Constraints may include, e.g., the time required between successive impressions of a given advertisement, maximum number of impressions allowed, etc. If the constraints do not rule out the advertisement, it is placed in the subscribers' individual list of advertisements. The individual list is prioritized in accordance with the prioritized master list generated by the Delivery Manager 54.

The system employs on-demand scheduling for individual users to reduce the communication volume over a network. On-demand scheduling avoids the need for replicating the large client command tables over the Internet from the master server 18 to the POP servers 16.

Advertisements in the individual list are retrieved by the CDS server 74 from the remote database 76 and sent to the subscriber in the specified order. The On-Demand Scheduler 70 provides the Delivery Manager 54 with data on the impressions delivered to each user so that the Delivery Manager 54 may reprioritize its list of advertisements as needed.

Scheduling Mathematics

The Capacity Forecaster 52 and the Inventory Manager 51 determine campaign achievability and construct the master delivery plan based on statistical behavior of subscribers (obtained, e.g., as described in the above-mentioned application Ser. No. 09/558,755), generally taking into consideration a number of random factors. One random factor, e.g., is that the system does not know whether a given user will log on at any given time period. Another random factor is that the amount of time the subscriber will be logged on (i.e., the length of an online session) is unknown. Accordingly, the number of advertisements that may be delivered to a particular subscriber for some given time period is unknown. The system models these random factors and uses probability distributions, expected values and related statistical computations based on knowledge of prior observed online behavior of users.

These random factors may be mathematically represented, e.g., as follows. A random subscriber will log onto the Web on any given day with a probability p. He or she will therefore not log onto the Web on any given day with probability $(1-p)$. Given that a subscriber logs onto the Web on a given day, suppose that a random subscriber's probability distribution function for Web time per day is given by $$F_s(s) \equiv P\{S \leq s\} = \text{Probability that the service time is less than or equal to a given value, say } s,$$

where S is a random variable indicating the subscriber's Web time per day (given that S is positive).

Suppose advertisements are to be sent to the subscriber once each T minutes for up to $A_{max}$ ads (e.g., $A_{max}=10$ ads per day). That is, the first advertisement is sent at time T minutes, the second at time 2T minutes and the $k^{th}$ at time kT minutes, $k \leq A_{max}[1-F_s(s)]$ is the probability that the Web subscriber remains on the Web on a random day for more that s minutes. Suppose that there are $A_{max}$ ads that the system would like the subscriber to see on any given random day. The probability that the system would be successful at delivering the $k^{th}$ such advertisement is $$P\{k^{th} \text{ ad delivered}\} = p[1-F_s(kT)] \equiv p_k, k=1, 2, \ldots \quad (1)$$

Equation (1) indicates that the probability that the $k^{th}$ advertisement slated for delivery will be successfully placed is equal to the product of two quantities: the probability p that the subscriber logs onto the Web on a given day and the conditional probability (given that he or she has logged on) that he or she remains logged on for at least kT minutes. Since $F_s(s)$ is a monotone non-decreasing function of s, $p_k$ is a non-increasing function of k. In other words, the likelihood of successfully placing an advertisement becomes less and less as the advertisement is placed lower in the advertisement priority list of the master plan generated by the Inventory Manager 51.

The mean number of advertisements placed to a random subscriber on a random day may be represented as follows:

$$\overline{A} = \sum_{k=1}^{A\max} p[1-F_s(kT)] = \sum_{k=1}^{A\max} p_k \quad (2)$$

The probability mass function for the number of advertisements placed may be found by taking successive differences in the cumulative distribution function for the random variable S, i.e.

$$P\{A=k\} = P\{S<(k+1)T\} - P\{S<kT\}, k=0, 1, 2, \ldots$$
$$P\{A=k\} = F_s([k+1]T) - F_s(kT) \; P(A=A_{max}) = 1 - P\{S<A_{max}T\} = 1 - F_s(A_{max}T) \quad (3)$$

The second moment of the number of advertisements placed may be represented as follows:

$$\overline{A^2} = \sum_{k=1}^{A\max-1} k^2\{F_s([k+1]T) - F_s(kT)\} + A_{max}^2[1-F_s(A_{max}T)] \quad (4)$$

An expression for the variance of the number of advertisements placed on a random day to a random subscriber may be written as follows:

$$VAR(A) \equiv E[(A-\overline{A})^2] \equiv \sigma_A^2 = \overline{A^2} - \overline{A}^2 \quad (5)$$

where the formulas for $\overline{A}^2$ and $\overline{A^2}$ are from Eqs.(2) and (4), respectively, and where E[*] is the expectation operator, which is defined further below with respect to Eqn(13).

Given the above foundational elements, an engineering approximation of queue ordering may now be calculated.

Suppose $E[Q_{jd}]$="average Queue placement for ad type j on day d" is thought of as an engineering approximation to its distribution over Queue placements. For instance, if $E[Q_{jd}]$=11.4, then ad type j averages between the $11^{th}$ and $12^{th}$ place in all individual ordered lists that include ad type j. Sometimes ad type j may find itself in a front position in an individual ordered list, perhaps even first or second; sometimes it may trail far back in the pack, perhaps at position 30 or so. The number 11.4 represents an average position over all individual ordered lists that are generated and that include ad type j.

Derived here an inequality that provides useful information on the required individual ordered list priority of a given ad.

Use the Definition:

$M_j$= average number of ads to be placed per day (For simplicity this ignores complications like holidays and weekends.)

Also, $P_j$ may be called the population of subscribers who are eligible for ad type j and recall that p is the fraction that log on during a random day. Thus the product Pp is the expected number of subscribers who log on during a random day and who are eligible for ad type j. F(x) is the probability that a logged on subscriber will have a session time less than or equal to x minutes in length. This means that $F(\Delta E[Q_j])$ is the probability that a logged on subscriber will have a session time less than or equal to $\Delta E[Q_j]$ minutes. Consequently, $\{1-F(\Delta E[Q_j])\}$ is the probability that a logged on subscriber will have a session time greater than to $\Delta E[Q_j]$ minutes. Thus, recognizing the LHS (left hand side) as the expected number of successful ad j placements during a day:

$$P_j\{p(1-F(\Delta E[Q_j]))\} \geq M_j$$

This equation may be manipulated to obtain:

$$1-F(\Delta E[Q_j]) \geq M_j/(P_j p) = \text{required number of ads to be delivered divided by the expected number of eligible users who log on} \quad (12)$$

This provides an upper bound of sorts on the maximum feasible value for $E[Q_j]$. That is, for a given parameter set, ad j should be placed at least at the position in the queue ("as experienced" by ad j) indicated by this inequality. Every night, the average value of $E[Q_j]$ may be found for each ad by using Forecaster, sampling without replacement for the entire population of subscribers, and tabulating separately for each on-going campaign.

The following is an example of a case in which the subscriber holding time is a negative exponential random variable, with mean τ. In recent statistical work, it has been found that the distribution of Web time per logon is negative exponential and its mean τ is approximately 31 minutes. In the case of a negative exponential distribution:

$$F(x) = Pr\{\text{session time} \leq x\} = 1 - e^{-x/\tau}$$

Thus Eq. (12) may be written in this case as $$e^{-\Delta E[Q_j]/\tau} \geq M_j/(P_j p)$$

The natural logarithms of both sides may be taken to obtain $$-\Delta E[Q_j]/\tau \geq \ln(M_j/\{P_j p\}) = \ln M_j - \ln P_j - \ln p.$$

(The natural logarithm is a strictly monotonic transformation, thereby preserving inequality directions. For example if $e^x$ is greater than or equal to some quantity, then x is greater than or equal to the natural logarithm of that quantity.)

Manipulating this equation, the desired constraint on the expected queue position may be obtained:

$$E[Q_j] \leq -\tau(\ln M_j - \ln P_j - \ln p)/\Delta \quad (13)$$

Consider the following numerical example: Suppose τ=31 minutes, $M_j$=10,000 ads per day, $P_j$=100,000 subscribers who are eligible for ad j, and p=0.15 (probability that a random eligible subscriber logs on during a random day), and Δ=2 minutes (time between ad impressions). Then, substituting into Eq. (13):

$$E[Q_j] \le -\tau(\ln M_j - \ln P_j - \ln p)/\Delta$$
$$= -31(\ln 10,000 - \ln 100,000 - \ln 0.15)/2$$

or $$E[Q_j] \le -31(\ln 10,000 - \ln 100,000 - \ln 0.15)/2$$
$$= -31(9.21 - 11.51 - (-1.90))/2$$
$$= -31(-0.4)/2 6.2.$$

This means that in order to deliver the required number of type j ads today, the average individual ordered list position for type j ads must be 6.2 or less. (As used herein, lower position numbers represent higher priorities). A sensitivity analysis may be easily be performed here. Suppose the inter-ad placement time $\Delta$ is doubled to 4 minutes. Then $E[Q_j]$ must be 3.1 or less, a much more stringent constraint due to fewer total ads being placed. But suppose that $\Delta$ remains fixed at 2 minutes and that the mean time per session logon increases 50% to 46.5 minutes.

Then $E[Q_j]$ may increase up to 50% above its previous value, to 9.3. So it may be seen how the individual ordered list inequality yields constraint values that are directly proportional to the mean time per session $\tau$ and inversely proportional to the time between ads placement $\Delta$. The functional behavior with respect to population count, number of ads to be placed and probability of logon all are more complicated due to the natural logarithms. But a key observation is that this equation (13) may readily be used to perform sensitivity analyses on any combination of these quantities.

Additional mathematics may be employed to embody the optimization of the internal master list ordering. A so-called Delivery Specification Optimizer (DSO) software module may embody the mathematical properties to adjust the ordering of the queue list. Specifically, the DSO attempts to find a queue list S such that, for each ad A, the "delivery ratio":

DeliveryRatio(A)=E(number of deliveries for A|S)/goal(A), where E(number of deliveries of A|S) is probabilistic shorthand for number of impressions of A the master list ordering S will deliver on an average day is the same for all advertisements.

The delivery ratio is used to assess the performance of an individual content delivery in proportion to the master list. This provides the basis of evaluating the efficiency of the master list ordering. Different queue list orderings are evaluated according to the DeliveriesExpected they yield compared to the input DeliveriesRequested. The DSO attempts to achieve a constant value of DeliveriesExpected/DeliveriesRequested over all ads; or as close to this optimum as is possible. In other words, the algorithm attempts to minimize the fitness value, where:

The fitness value=the sum of squares of (DeliveryRatio(ad)−DeliveryRatio({all ads}))  (Eqn. 14)

The DSO could optionally utilize numerical analysis methods to derive the relative importance of each piece of content in the queue list. The over all fitness of a queue ordering is the sum of the values of all of the contracted content deliveries. This value is a differentiable function with respect to the weightings. As a result, the DSO may use multi-dimensional Newton's method or the steepest descent method to rapidly approach an optimal solution.

Delivery Qualities

In accordance with a further embodiment, the scheduler system ensures that subscribers always have content to display even if they are not eligible for any active campaigns. Accordingly, the system preferably provides a set of default or filler impressions to be displayed when there is no content available for a given user.

In accordance with a further embodiment, the scheduler system is capable of delivering 'instant' advertisements (or other content) to subscribers. These are advertisements that are delivered to users if they perform some given action, e.g., enter a particular keyword in a search engine query or enter a particular URL address. The system may preempt the normal queue of ordered advertisements in an individual schedule with an instant advertisement when needed. The system allows the percentage of time that instant advertisements may preempt the normal queue to be configurable in order to reduce errors in calculations made by the Capacity Forecaster.

The system improves use of excess inventory. It may also increase the likelihood of over-delivery (i.e., delivering a greater number of impressions than requested by an advertiser), which is typically favorable to advertisers. It provides a generally even distribution of impressions over the length of the campaign (if so desired). The system provides greater diversification of impressions (i.e., the advertisements are distributed to different users in a target group).

Having described embodiments, it should be apparent that modifications may be made without departing from the spirit and scope of what is claimed.

What is claimed is:

1. A method of scheduling delivery of multiple items of content selectively to a plurality of online users, comprising:
   determining expected values relating to each user being online to access information over the Internet during a given time period;
   generating an ordered list of the items of content to be selectively delivered to the users based on the expected values, said ordered list being prioritized to meet delivery requirements associated with said items of content; and
   generating an individual list of items of content to be delivered to each user based on the ordered list, wherein said individual list is dynamically generated for each user on user login.

2. The method of claim 1 wherein said expected values are estimated from observed behavior of individual users.

3. The method of claim 1 wherein said expected values include a probability of each user being online during the given time period.

4. The method of claim 1 wherein said expected values include a length of time each user is expected to be online during the given time period.

5. The method of claim 1 wherein each said user has known profile or preference data, and said items of content are selectively delivered to users based on their profile or preference data.

6. The method of claim 1 wherein said ordered list is periodically generated based further on prior content deliveries made.

7. The method of claim 6 wherein said ordered list is generated daily.

8. The method of claim 1 wherein each individual list specifies items of content for which a user is qualified to receive based on user profile or preference data.

9. The method of claim 8 wherein said individual list excludes certain items of content based on one or more constraints.

10. The method of claim 9 wherein said one or more constraints includes the maximum number of times an item of content may be delivered to the user.

11. The method of claim 9 wherein said one or more constraints includes the time elapsed since a given item of content was delivered to the user.

12. The method of claim 1 wherein said items of content comprise advertisements to be displayed on a display device operated by each user.

13. The method of claim 12 wherein said advertisements comprise banner advertisements.

14. The method of claim 12 wherein said advertisements comprise pop-up advertisements.

15. The method of claim 1 further comprising tracking which items of content have been delivered to each user.

16. The method of claim 1 wherein said users comprise World Wide Web users accessing Web sites over the Internet, and wherein said items of content comprise advertisements displayed on display devices operated by the users.

17. The method of claim 1 wherein said delivery requirements specify the number of times an item of content is to be delivered to the users.

18. The method of claim 1 wherein said delivery requirements specify a time period during which a given number of deliveries of an item of content is to be made.

19. The method of claim 1 wherein the ordered list is optimized by minimizing differences in performance between each item of content.

20. The method of claim 19 wherein the performance of an item of content is defined by a ratio of the number of times an item of content is delivered to the desired number of times the item of content is to be delivered.

21. A method for scheduling delivery of multiple advertisements selectively to a plurality of Web users, each advertisement being associated with a delivery contract, the method comprising:
   determining expected values including probability data relating to each user being online to access information over the Internet during a given time period;
   based on the probability data and known prior advertisement deliveries to users, generating an ordered master list of advertisements to be selectively delivered to the users, said list being prioritized to generally fulfill said contracts; and
   generating an individual list of advertisements to be delivered to each user on user login, said individual list specifying advertisements that said user is eligible to receive based on user profile data and in an order in accordance with said ordered master list.

22. The method of claim 21 wherein said probability data is based on observed behavior of individual users.

23. The method of claim 21 wherein said probability data includes a probability of each user being online during the given time period.

24. The method of claim 21 wherein said probability data includes a length of time each user is expected to be online during the given time period.

25. The method of claim 21 wherein said ordered master list is periodically generated based further on prior content deliveries made.

26. The method of claim 25 wherein said ordered master list is generated daily.

27. The method of claim 21 wherein said individual list excludes certain advertisements based on one or more constraints.

28. The method of claim 27 wherein said one or more constraints includes a number of times an advertisement has been delivered to the user.

29. The method of claim 27 wherein said one or more constraints includes a time elapsed since a given advertisement was delivered to the user.

30. The method of claim 21 wherein said advertisements comprise banner advertisements.

31. The method of claim 21 wherein said advertisements comprise pop-up advertisements.

32. The method of claim 21 further comprising tracking which items of content have been delivered to each user.

33. The method of claim 21 wherein said users comprise Web surfers accessing Web sites over the Internet.

34. The method of claim 21 wherein said contracts specify the number of times an advertisement is to be delivered to the users.

35. A computer system for scheduling delivery of multiple items of content selectively to a plurality of online users, the computer system comprising:
   a memory for storing a program; and
   a processor operative with the program to:
      (a) determine expected values relating to each user being online to access information over the Internet during a given time period;
      (b) generate an ordered list of the items of content to be selectively delivered to the users based on the expected values, said ordered list being prioritized to meet delivery requirements associated with said items of content; and
      (c) generate an individual list of items of content to be delivered to each user based on the ordered list, wherein said individual list is dynamically generated for each user on user login.

36. A system for scheduling and delivering multiple items of content selectively to a plurality of online users, each item of content being associated with a delivery contract, the system comprising:
   a central computer for determining data relating to a probability of a given user being online to access information over the Internet during a given time period, and generating an ordered master list of items of content to be delivered based on the probability data and known prior deliveries of items of content to users, said ordered master list being prioritized to enhance fulfillment of said contracts; and
   a plurality of local computers linked to said central computer, each local computer generating an individual schedule for each of a set of users logging on to said computer on user login, said schedule comprising an individual list of selected items of content to be delivered to said user in accordance with said ordered master list, said selected items of content comprising content for which the user is eligible to receive based on user profile or preference data.

37. The system of claim 36 wherein said central computer comprises a Web server.

38. The system of claim 36 wherein each of said local computers comprises an Internet service provider point-of-presence server.

39. A method of scheduling and delivering multiple items of content selectively to a plurality of online users, the method comprising:
   determining expected values relating to each user being online to access information over the Internet during a given time period;

generating an ordered master list of the items of content to be selectively delivered to the users based on the expected values, said ordered master list being prioritized to meet delivery requirements associated with said items of content;

dynamically generating an individual list of items of content to be delivered to each user on user login, said individual list specifying items of content that said user is eligible to receive based on user profile data and in an order in accordance with said ordered master list; and delivering to each logged on user items of content specified in the user's individual list.

40. The method of claim 39 wherein said expected values are estimated from observed behavior of individual users.

41. The method of claim 39 wherein said expected values include a probability of each user being online during the given time period.

42. The method of claim 39 wherein said expected values include a length of time each user is expected to be online during the given time period.

43. The method of claim 39 wherein said ordered master list is periodically generated based further on prior content deliveries made.

44. The method of claim 43 wherein said ordered master list is generated daily.

45. The method of claim 39 wherein said individual list excludes certain items of content based on one or more constraints.

46. The method of claim 45 wherein said one or more constraints includes a number of times an item of content has been delivered to the user.

47. The method of claim 45 wherein said one or more constraints includes a time elapsed since a given item of content was delivered to the user.

48. The method of claim 39 wherein said items of content comprise advertisements to be displayed on a display device operated by each user.

49. The method of claim 48 wherein said advertisements comprise banner advertisements.

50. The method of claim 48 wherein said advertisements comprise pop-up advertisements.

51. The method of claim 39 further comprising tracking which items of content have been delivered to each user.

52. The method of claim 39 wherein said delivery requirements specify a number of times an item of content is to be delivered to the users.

53. A method of scheduling delivery of multiple items of content selectively to a plurality of online users, the method comprising:

receiving an ordered master list of the items of content to be selectively delivered to the users based on expected values relating to each of the plurality of online users, said ordered master list being prioritized to meet delivery requirements associated with said items of content; and for each user on user login to the Internet, dynamically generating an individual list of items of content to be delivered to the user, said individual list specifying items of content that the user is eligible to receive based on user profile data and in an order in accordance with said ordered master list.

54. The method of claim 53 further comprising excluding from said individual list certain items of content based on a constraint.

55. The method of claim 54 wherein said constraint comprises a limit on a number of times an item of content may be delivered to a user.

56. The method of claim 54 wherein said constraint comprises a minimum time elapsed since a given item of content was delivered to the user.

* * * * *

UNITED STATES PATENT AND TRADEMARK OFFICE
CERTIFICATE OF CORRECTION

| | | |
|---|---|---|
| PATENT NO. | : 8,332,268 B2 | Page 1 of 1 |
| APPLICATION NO. | : 11/619706 | |
| DATED | : December 11, 2012 | |
| INVENTOR(S) | : Carruthers et al. | |

It is certified that error appears in the above-identified patent and that said Letters Patent is hereby corrected as shown below:

On title page 2, in column 2, References Cited under "Other Publications", line 5, delete "dictionary,(May" and insert --dictionary, (May--, therefor Signed and Sealed this
Twenty-fifth Day of November, 2014

Michelle K. Lee
*Deputy Director of the United States Patent and Trademark Office*